UNITED STATES PATENT OFFICE 2,414,803

VULCANIZABLE COMPOSITIONS

Gaetano F. D'Alelio, Pittsfield, Mass., assignor to General Electric Company, a corporation of New York No Drawing. Application September 17, 1942, Serial No. 458,727

6 Claims. (Cl. 260—84.5)

The present invention relates to new synthetic resinous compositions and more particularly to potentially reactive, (i. e., heat-convertible or vulcanizable) flexible and elastic compositions which possess both the properties of flexible thermoplastic resins and the elasticity and heat-convertibility of the natural and synthetic rubbers. Specifically, this invention is concerned with the production of compositions containing polymerization products of a mixture of the following polymerizable components: (1) at least one vinyl aryl compound, e. g., styrene, (2) at least one acrylic acid ester of the formula

where Z is a radical of a monohydric alcohol, e. g., methyl, ethyl, phenyl, etc., and (3) at least one diene-1,3, of the formula

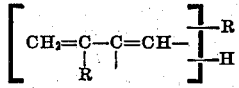

where R is a member of the class consisting of hydrogen and the methyl radical, the limits of the polymerizable components used being within the range hereinafter specified.

It has heretofore been known that in the preparation of the so-called synthetic rubbers, the diene component, e. g., butadiene, comprised at least fifty and as much as seventy to eighty per cent of the polymerizable mass, and that the remaining component was either styrene or acrylonitrile. Furthermore, the high concentration of butadiene was required to give the synthetic rubber a certain degree of flexibility and elasticity and to impart other properties similar to rubber. I have now discovered that valuable advantages can be gained by the production of synthetic resinous compositions of the present invention. Primarily, in accordance with my invention, the amount of butadiene required as compared to that required in conventional synthetic rubber production is considerably reduced and the acrylic acid ester component contributes other desirable properties to the finished product. Furthermore, acrylic acid esters are readily derivable from agricultural products. For example, lactic acid and its esters, which may be prepared from dextrose bodies such as the natural occuring dextrose substances which are present in skim milk, corn syrup and sugar, strap molasses, etc., can be dehydrated to the corresponding acrylate derivatives thus contributing to an agricultural economy.

Another advantage accrues from the practice of my invention. The vulcanizable resinous compositions of my invention may be prepared in a much shorter time than that required for the conventional synthetic rubbers, that is, the butadiene-styrene or the butadiene-acrylonitrile compositions. Within the range of compositions used in the practice of my invention, low pressure equipment is satisfactory for the process, and the yields of the tripolymer is 100% within a reasonable reaction time. Thus, in the system butadiene, styrene, ethyl acrylate, the acrylate apparently acts as an accelerator of polymerization since only fifty per cent or less of the normal time is required to complete the polymerization as compared to a system from which the acrylate is omitted. Since a conversion of 100% of the polymerizable mass occurs in the practice of this invention, no complicated or expensive recovery system is required for the unconverted butadiene as now found in the conventional synthetic rubber plants. Too, since the butadiene used in preparing the compositions of this invention is in the minor proportion, in the unvulcanized or unconverted state, these compositions find utility as thermoplastic resins. The convertible and vulcanizable compositions of this invention likewise have greater utility than either the natural or conventional synthetic rubbers. The presence of the ester groups permits the compatibility of these compositions with numerous resinous and synthetic bodies, not normally compatible with conventional rubber-like bodies. The presence of both the ester groups, and the two hydrocarbon groups, e. g., the diene and the vinyl aryl compound, permits a wide range of plastisizers as well as extenders to be incorporated into the polymerized mass.

A further advantage resulting from the practice of my invention is the resistance of the tripolymer to atmospheric attack. Ordinary soft rubbers are obtained by vulcanizing only a fraction of the double bonds present in the elastomer. This process leaves behind many double bonds which are sources of attack from oxygen, ozone, hydrogen sulfide, etc. The addition of antioxidants retards this effect but does not eliminate it. Because of this, industrial rubber products have a limited life. According to the present invention, the number of double bonds present from the butadiene, is relatively small. These bonds may be completely saturated by vulcanization, thus removing the possibility of future oxidation or attack by other active materials, and at the same time, due to the presence of the acrylic ester, permitting the product to retain its elastomeric characteristics.

The polymerizable components used in the practice of this invention may be varied within the following limits depending on the nature of the product desired.

| Polymerizable component: | Percent by weight |
|---|---|
| Mono-vinyl aryl compound | 25–65 |
| Acrylic acid ester | 65–25 |
| Diene-1,3 | 1.75–30 |

For the production of synthetic compositions most closely resembling rubber the preferred range of polymerizable components is:

| Polymerizable component: | Percent by weight |
|---|---|
| Mono-vinyl aryl compound | 25–40 |
| Acrylic acid ester | 40–55 |
| Diene-1,3 | 15–25 |

Such compositions possess elasticity and extensibility together with rapid recovery following the release of the deformation forces. In addition, the strength and toughness characterized by these compositions compare favorably with other synthetic and natural rubber products. The electrical insulating properties of these compositions are greatly enhanced by the presence of the mono-vinyl aryl compound, e. g., styrene. The diene-1,3 component confers the property of vulcanizability upon the polymer with resultant reduction in the cold flow properties. Likewise such vulcanizable products may be removed from their molds at elevated temperatures thus saving operation costs.

The term mono-vinyl aryl compound embraces within its meaning styrene and homologues of styrene, such as alpha-methyl styrene, ortho-methyl styrene, meta-methyl styrene, para-methyl styrene, the ortho-, meta- and para-ethyl styrenes, the ortho-, meta- and para-chloro styrenes, the ortho-, meta- and para-vinyl benzoic esters, the ortho-, meta- and para-vinyl phenyl ethers, the vinyl diphenyls, etc.

The term diene-1,3 includes the hydrocarbon materials of the formula

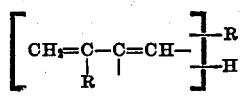

wherein R is a member of the class consisting of hydrogen and the methyl radical. It is apparent from an inspection of the above formula that the term diene-1,3 includes the butadienes-1,3 of the formula

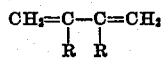

where R has the meaning above given, and the pentadienes-1,3 of the formula

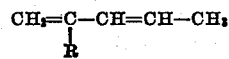

where R has the meaning above given. Pentadienes of this formula have higher boiling points, for example 2-methyl pentadiene-1,3

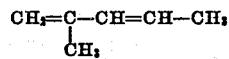

boils at approximately 70° C. as compared with butadiene which boils at −3° C. The higher boiling point of the pentadiene permits the use of less expensive manufacturing equipment.

As pointed out above the acrylic acid ester component is represented by the structure

where Z is the radical of a monohydric alcohol, for example, methyl, ethyl, propyl, butyl, amyl, hexyl, phenyl, chlorophenyl, cresyl, cyclohexyl, naphthyl, phenethyl, phenoxyethyl, phenoxypropyl, nitromethyl, nitrophenyl, nitroethyl, chloroethyl, etc., preferably a lower alkyl radical, such as methyl, ethyl, propyl and butyl, for reasons of economy.

I have discovered that the inclusion of even such small amounts as 1.75% of diene component is sufficient to change the character of the copolymer of mono-vinyl aryl compound and acrylic ester. When a composition of this type is vulcanized there is a notable improvement in the cold flow properties as compared to a resin made from a mono-vinyl aryl compound and an acrylic ester alone. The former will retain its shape under moderate stresses and temperatures from about 80 to 100° C. or higher, whereas the latter will not retain its shape at such elevated temperatures even without any stress. This resistance to cold flow and low temperature flow is important in many industrial applications.

The polymerizable compositions of this invention may be polymerized in mass or in emulsion form to give a latex type body or in dispersion form to give granulated products, depending on the product desired and the application for which it is intended. The emulsions or dispersions are preferably prepared in a water medium under the influence of appropriate dispersion or emulsifying agents, e, g., the water soluble soaps, polyvinyl alcohol, polyacrylic acid, polymethacrylic acid, the water soluble salts of polymerized methylene polycarboxylic acids, the water soluble salts of the styrene-maleic anhydride copolymers disclosed and claimed in my copending application Serial No. 449,677, filed July 3, 1942, and assigned to the same assignee as the present invention, the water soluble salts of the sulfosuccinic esters, etc.

Any suitable method may be used in preparing the polymerizable compositions of this invention. For example, the polymerizable components may be polymerized in the presence or absence of a solvent or a dispersion medium for the monomers by the use of heat, light, or heat and light in the presence or absence of a polymerization catalyst, at atmospheric, subatmospheric or superatmospheric pressure.

Suitable catalysts are the peroxides, e. g., benzoyl peroxide, sodium peroxide, hydrogen peroxide, acetyl benzoyl peroxide, etc.; the per-compounds, e. g., ammonium persulfate, sodium persulfate, sodium perchlorate, sodium perborate, potassium persulfate, etc.; ozone, ozonides, etc. Additional examples of polymerization catalysts that may be used are found in my U. S. Patent 2,260,005, issued October 21, 1941, and assigned to the same assignee as the present invention.

Instead of starting with monomeric materials, I may start with partially polymerized materials or with mixtures of monomeric and partially polymerized materials.

The following examples are given to illustrate how this invention may be carried into effect:

*Example 1*

The following tabulation shows a definite relationship between the time of polymerization and the quantity of butadiene present in the monomeric mixture. In each case the quantity (parts by weight) of ingredients noted was sealed in an autoclave and heated for some definite time at steadily increasing temperatures until polymerization was complete or the reaction discontinued.

| Ex. | Styrene | Butadiene | Ethyl acrylate | Heat treatment, hours at °C. | | | | Yield of polymer |
|---|---|---|---|---|---|---|---|---|
| | | | | 50° | 65° | 75° | 95° | |
| A | 35.0 | 2.0 | 65.0 | | 26 | 44 | | Quantitative. |
| B | 35.0 | 5.0 | 65.0 | | 26 | 44 | | Do. |
| C | 35.0 | 10.0 | 65.0 | | 26 | 44 | | Do. |
| D | 35.0 | 20.0 | 65.0 | | 24 | 116 | 68 | Do. |
| E | 35.0 | 40.0 | 65.0 | | 24 | 116 | 192 | Very low. |
| F | 20.0 | 46.7 | | 550 | 144 | 400 | | 70%. |

In each of the above cases, 0.5 part of benzoyl peroxide was used except in the case of "F" wherein 0.75 part of catalyst was used. Nevertheless, even this added increase in catalyst concentration was not sufficient to hasten polymerization. From the above data it can be seen that the tripolymers of the present invention are capable of rapid polymerization. As shown in the table, when the butadiene is present in greater than 30 parts on the basis of 130 parts of resin, the time of conversion is greatly increased.

*Example 2*

| | Parts by weight |
|---|---|
| Styrene | 260.0 |
| Ethyl acrylate | 480.0 |
| Butadiene-1,3 | 80.0 |
| Benzoyl peroxide | 4.3 |
| 2% aqueous Aerosol OT (dispersion agent—dioctyl ester of sodium salt of sulfosuccinic acid) | 2000.0 |

The autoclave was fitted with a stirring mechanism which was used only intermittently. At no time did the temperature exceed 90° C. nor the gauge pressure 26 pounds per square inch. The reaction was carried out by slowly increasing the temperature over an eight-hour period to 85° C. The polymerization was continued overnight at 75°–81° C. and finally for about two hours at 81°–90° C. The autoclave was cooled and then opened. The majority of the polymer was in fine, granular form, although a latex containing 9% resin solids was obtained. The latex was precipitated by the addition of hydrochloric acid and heat. The tripolymer was washed and dried and then milled on cold rolls to rid it of volatile matter. The yield of sheeted product was quantitative. The polymerization product was light in color, very pliable, easily flexed and extended with good recovery.

*Example 3*

| | Parts by weight |
|---|---|
| Ethyl acrylate | 475.0 |
| Styrene | 255.0 |
| Butadiene-1,3 | 221.0 |
| Benzoyl peroxide | 4.6 |
| 2% aqueous Aerosol OT solution (dioctyl ester of sodium salt of sulfosuccinic acid) | 2000.0 |

The above ingredients were placed in an autoclave and polymerized for 68 hours holding the temperature predominantly between 70–85° C. at the end of which time the reaction had been completed. The isolated polymer was washed and dried. The product was sheeted on a mill to a homogeneous mass. The yield of resin was quantitative. It was light in color, very flexible and extensible with quick recovery.

*Example 4*

| | Parts by weight |
|---|---|
| Tripolymer from Example 2 | 50.0 |
| Carbon black (Micronex) | 12.5 |
| Vulcanizer | 2.5 |

The tripolymer was milled on the rolls, both rolls having been chilled, and the carbon black added slowly until a homogeneous product was obtained. This was then treated with the vulcanizer, which except where otherwise specified hereinafter consisted of a mixture of the following:

| | Parts by weight |
|---|---|
| Altax (benzothiazyl disulfide) | 100 |
| Agerite (phenyl beta-naphthylamine) | 100 |
| Stearic acid | 100 |
| Sulfur | 200 |
| Zinc oxide | 500 |

The modified tripolymer was milled until the desired homogeneity was obtained. A portion of the milled resin was pressed between platens at 700 pounds per square inch pressure and 120° C. for 30 minutes and the pressed sheet removed from the mold. It had good strength, excellent flexibility and extensibility with good recovery.

*Example 5*

| | Parts by weight |
|---|---|
| Tripolymer of 2 | 50 |
| Carbon black (Micronex) | 25 |
| Plasticizer [triethylene glycol di-(2-ethyl butyrate)] | 2.5 |
| Vulcanizer | 2.5 |

Each of the above ingredients was incorporated in the order listed into the tripolymer which was first milled on the chilled rolls. The modifying ingredients were easily compatible with the resin.

The resin was placed between platens and pressed at 120° C. and 700 pounds per square inch pressure for 30 minutes. The vulcanized sheet was tack-free, easily flexible, pliable, extensible, with good recovery properties. The molded piece possessed an excellent surface.

*Example 6*

The tripolymer of the present invention is compatible with numerous materials, such as resins, fillers and plasticizers. This example illustrates how this property may be used to utilize and improve present industrial products.

| | Parts by weight |
|---|---|
| Tripolymer from Example 2 | 50 |
| Reclaim rubber (whole tire) | 50 |
| Carbon black (Micronex) | 50 |
| Vulcanizer | 5 |

The tripolymer was milled on the chilled rolls. The reclaim rubber, carbon black and vulcanizer were successively added in that order and milled after each addition until a homogeneous milled product was obtained.

The resin was pressed between platens at 600 pounds per square inch and 155° C. for 15 minutes. The vulcanized product was removed while still hot. The product was exceptionally good, possessing excellent flexibility and pliability. The vulcanized product was extensible with quick recovery properties.

Example 7

| | Parts by weight |
|---|---|
| Tripolymer of Example 2 | 50 |
| Carbon black (Micronex) | 25 |
| Vulcanizer | 2.5 |

The above components were treated in the same manner as Example 4 with almost identical results.

Example 8

| | Parts by weight |
|---|---|
| Tripolymer of Example 2 | 20 |
| Vulcanizer | 1 |

These were milled together on the differential rolls until a homogeneous product was obtained. This was then pressed at 155° C. and 700 pounds per square inch for 15 minutes. The vulcanized sheet was extremely flexible, pliable and extensible with good recovery. When stretched, it formed an extremely thin membrane which was translucent and possessed considerable strength.

Example 9

| | Parts by weight |
|---|---|
| Tripolymer from Example 3 | 50 |
| Carbon black (Micronex) | 25 |
| Vulcanizer | 2.5 |

The tripolymer was milled on chilled rolls with carbon black until a homogeneous sheet was obtained. The vulcanizer was now added and milling continued until a uniform product was obtained.

The modified resin was pressed between platens at 120° C. for 30 minutes using 700 pounds per square inch pressure. The vulcanized product was easily flexed, pliable, and extensible with good recovery.

Example 10

| | Parts by weight |
|---|---|
| Tripolymer from Example 3 | 50 |
| Carbon black (Micronex) | 25 |
| Plasticizer [triethylene glycol di-(2-ethyl butyrate)] | 2.5 |
| Vulcanizer | 2.5 |

The above ingredients were milled on the cold differential rolls, the tripolymer being placed on first and the remaining ingredients successively added until a highly uniform product was obtained.

When a portion of this product was pressed at 120° C. and 700 pounds per square inch pressure for 30 minutes between platens and extracted, a highly flexible, vulcanized, extensible product having good recovery was obtained.

Example 11

| | Parts by weight |
|---|---|
| Tripolymer from Example 3 | 50 |
| Reclaimed rubber (whole tire) | 50 |
| Carbon black (Micronex) | 50 |
| Vulcanizer | 5 |

The tripolymer was first milled on the differential rolls. Each of the remaining components was then added successively and milled therewith until a homogeneous product was obtained. The ingredients were easily compatible with each other.

A portion of the modified resin was placed between platens at 500 pounds per square inch pressure and 155° C. for 15 minutes. The vulcanized sheet was removed from the hot platens. The sheet possessed excellent flexibility and extensibility with good recovery.

Example 12

| | Parts by weight |
|---|---|
| Tripolymer of Example 3 | 50.00 |
| Altax (benzothiazyl disulfide) | 0.25 |
| Agerite (phenyl beta-napththylamine) | 0.25 |
| Stearic acid | 0.25 |
| Sulfur | 0.50 |

The above ingredients were milled on chilled rolls until a homogeneous sheeted product was obtained.

This resin could be vulcanized by the method described above.

Although in the above examples I have used butadiene-1,3 as the diene-1,3 component, other butadiene-1,3 compounds embraced by the formula

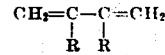

wherein R is hydrogen or the methyl radical, e. g., 2-methyl butadiene-1,3 and 2,3-dimethyl butadiene-1,3 may be used. Pentadiene-1,3 compounds of the formula

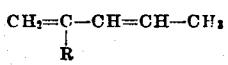

wherein R is hydrogen or the methyl radical, e. g., pentadiene-1,3 and 2-methyl pentadiene-1,3, likewise may be used in place of the butadiene-1,3.

It is surprising that the compositions of the present invention can be readily prepared since numerous attempts have been made to prepare tripolymeric compositions possessing the properties of elasticity, recovery and vulcanizability or heat convertibility. Thus, when vinyl chloride is substituted for the styrene in the polymerizable compositions of this invention in an effort to prepare a tripolymer of butadiene, vinyl chloride and ethyl acrylate, no tripolymer is formed. Similarly, no tripolymer or other useful product is obtained when the system butadiene, styrene and vinyl acetate is subjected to polymerizing influences.

Vulcanization may be accomplished through any of the numerous methods used to vulcanize natural, reclaim or synthetic rubber, such as by means of certain nitro compounds, benzoquinone dioxime, thiuram derivatives, sulfur, lead oxide, hexamethylene tetramine, the guanidines, e. g., diphenyl guanidine, salts of the thiuram derivatives, etc.

The heat convertible resins of this invention are compatible with numerous natural and synthetic bodies. For example, they are compatible with all types of reclaim rubber, natural rubber, the synthetic rubbers, such as the Buna N and the Buna S types, the butyl and the chloroprene types of rubbers. Among the other synthetic bodies, they may be compounded with polyalkene type of polymer, such as polythene, polyisobutylene, the polyalkylene sulfides and the like. By suitable processing, these resins are compatible with polystyrene, polystyrene copolymers with acrylic ester, with the methacrylic and acrylic acids and esters and copolymers, with the polyvinyl compounds, such as polyvinyl acetate, polyvinyl acetals, such as the formal, the acetal, the butyral, and the like, copolymers of vinyl halides with other vinyl and acrylic esters, plasticized polyvinyl chloride, cellulose acetate and the like. Mineral rubber, (i. e., blown asphalt)

coumar, indene and coumar-indene resins as well as factice are extremely compatible with the resins of this invention.

Another extremely unexpected feature of these resins is that they tolerate loading and filling extremely well and are actually reinforced by finely divided carbon black such as channel black.

Among the fillers and modifiers which may be added to these compositions may be mentioned channel black, zinc oxide, aluminum oxide, celite, wood flour, walnut shell flour, asbestos, leather scraps, silex, magnesium carbonate, mica, glass, fabric in continuous or shredded form, cellulosic products, calcium sulfate, lignin, lignocellulose, clay, whiting, ferrous oxide, ferric oxide, etc.

As lubricants, there may be used the free fatty acids, such as stearic and lauric acids, salts of fatty acids, such as the calcium, zinc, tin, etc., salts of lauric, stearic, oleic, etc., acids.

As plasticizers, there may be used the phenyl, benzyl and phenethyl esters of polycarboxylic acid, e. g., the adipates, sebacates, phthalates; the ethers and esters of polyhydric alcohols, for example, esters and ethers of glycol, diethylene glycol, triethylene glycol, glycerine, diglycerine, etc. for example, the acetates, propionates, butyrates, hexoates, benzoates, toluates; the mono and polycarboxylic esters of nitro alcohols, etc.; the alkoxyaryl alkanes, e. g., beta,beta'-bis-(para-methoxy-phenyl) propane; ketones, e. g., acetophenone, isophorone, acetoacetic esters, etc.; esters of acetylated hydroxy acids, e. g., acetyl tributyl citrate, acetyl triethyl citrate, butyl acetyl ricinoleate, etc.; esters of hydroxy acids, dibutyl tartrate, etc.; esters of cyano alkanols, e. g., bis-(alpha-cyano ethyl) phthalate, etc.; esters of hydroxy aromatic acids and their ether derivatives, e. g., benzyl para-hydroxy benzoate, etc.; and numerous other plasticizers.

The plasticized and unplasticized polymerization products of this invention in combination with other natural or synthetic resins have extremely wide application. They may be used in flexible or rigid diaphragms which are extremely resistant to moisture, water and solvents. They, likewise, find application as sealing materials for porous bodies, such as natural, cellulosic, rubber or synthetic resin sponges and the like, for matted fibrous materials, such as fabric felts, matted wood shavings or fibers, blown or spun glass threads, etc.

By means of suitable blowing agents, or by compounding with suitable extractable, granulated materials, they may be used in the preparation of sponge materials. Suitable hose and flexible tubing, highly resistant to flexing faults may be prepared either by extrusion methods or by coating fabric in tubular form. On fabrics of suitable texture, they may be used in the preparation of water protective devices, such as raincoats, shower curtains, engine hoods, or when impregnated or calendered on appropriate base materials they can be used as replacements of high quality leather, such as in shoe tops, belts, gun holsters, friction and conveyor belting and the like. These resins, when used alone or with suitable diluents, fillers, etc., can be converted into excellent shoe soles and heels.

Inking and printing rolls of good durability likewise may be prepared from the plastic compositions of this invention. As a lamina between plates of glass, excellent safety glass can be prepared. A thin film of a polyvinyl butyral type composition may be used to aid bonding between the resins and the glass.

Tire carcasses or even complete industrial tires may be prepared from these resins when combined with suitable cording. Exceptionally resistant tires may be prepared by treading the tire with either the unplasticized resin or a resin previously compounded with natural or reclaim rubber or other synthetic resins.

When compounded with the synthetic rubbers of the styrene-butadiene or acrylonitrile-butadiene type, the whole mixture, including fillers can be co-vulcanized in the usual manner with or without added fillers. Thus, either alone or in combination with rubber, they may be used in the applications cited above and even extended to a process of bonding rubber composition directly to these resins or through the intermediate composition comprising a rubber and resin combination. In this fashion, the bonding of rubber to such materials as glass, wood, cement, metals, electrical conductors, etc., may be accomplished. In combination with unvulcanized rubber, they may be used in the construction of self-sealing gas tanks, which in addition may be lined or surface-coated with an unplasticized acrylonitrile copolymer. They also may be used to sheath such electrical insulators as polythene, polyisobutylene, butyl rubber and styrene against solvent attack.

What I claim as new and desire to secure by Letters Patent of the United States:

1. A vulcanizable composition comprising the thermoplastic product of emulsion polymerization of a mixture containing essentially 25–40% styrene, 40–55% ethyl acrylate, and 15–25% of a butadiene-1,3 of the formula

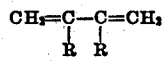

wherein R is a member of the class consisting of hydrogen and the methyl radical.

2. A vulcanizable composition comprising the thermoplastic product of emulsion polymerization of a mixture containing essentially 25–40% styrene, 40–55% ethyl acrylate, and 15–25% butadiene-1,3.

3. A vulcanizable composition comprising the thermoplastic product of emulsion polymerization of a mixture containing essentially 25–40% styrene, 40–55% ethyl acrylate, and 15–25% 2-methyl butadiene-1,3.

4. The product of vulcanization of the composition of claim 1.

5. The product of vulcanization of the composition of claim 2.

6. The product of vulcanization of the composition of claim 3.

GAETANO F. D'ALELIO.